Nov. 22, 1966 J. C. MACLAY 3,286,476
CABLE LAYING PLOW
Filed Sept. 30, 1963 5 Sheets-Sheet 1

INVENTOR
J.C. MACLAY
BY
John C. Morris
ATTORNEY

Nov. 22, 1966    J. C. MACLAY    3,286,476
CABLE LAYING PLOW

Filed Sept. 30, 1963    5 Sheets-Sheet 4

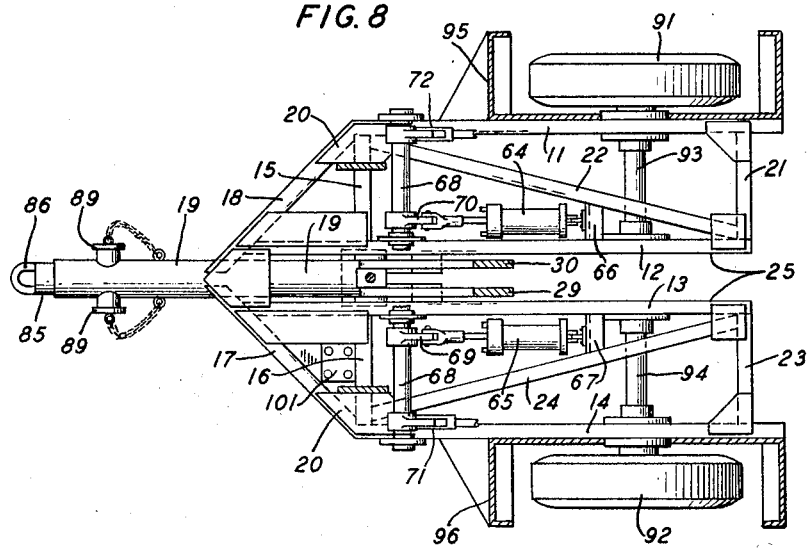
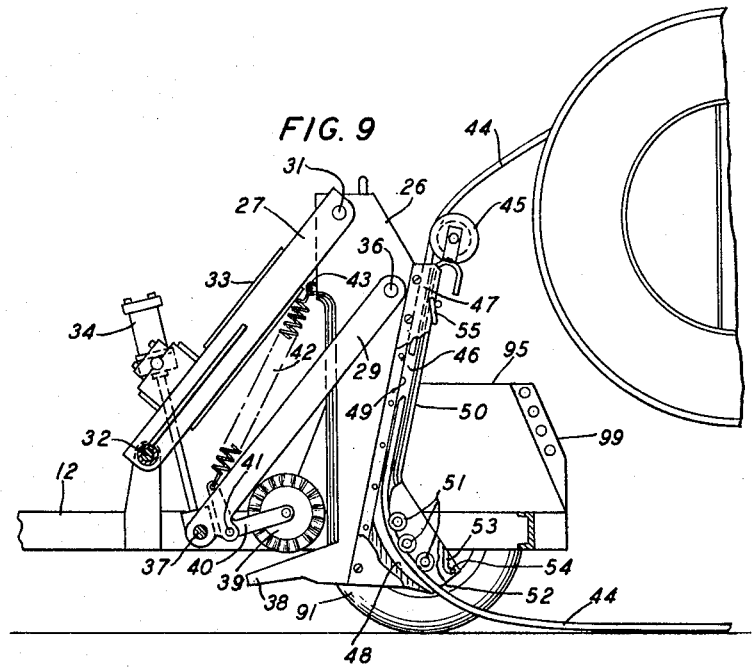

3,286,476
CABLE LAYING PLOW
John C. Maclay, Basking Ridge, N.J., assignor to Bell Telephone Laboratories, Incorporated, New York, N.Y., a corporation of New York
Filed Sept. 30, 1963, Ser. No. 312,776
4 Claims. (Cl. 61—72.6)

This invention relates to equipment for placing cable underground, and more specifically, to a trailed plow for inserting electrical cable underground at various depths.

The increase in underground facilities has necessitated the development of equipment for the economic and efficient placement of underground cable. The plows that are presented by the prior art are of two general kinds: first, the trailed plow, and secondly, the fixed plow. Trailed plows are similar to trailers in that they are attached to a tractor by means of a pulling hitch and towed behind it. Fixed plows are devices that are rigidly attached to the pulling means, such as by links, and use the means as a platform or base against which they work.

The two general types of plows, namely, fixed or trailed, each have their own advantages. For example, the turning radius of a plow that is attached or fixed to the pulling means is generally smaller than that of a trailed plow. Also, fixed plows may rely upon the weight of their prime mover to keep them in the ground while trailed plows have a tendency to rise out of the ground when pulling forces become large due to hard or dense ground conditions. An advantage of a trailed plow is that it may be easily disengaged from its moving means, thereby releasing the means for other jobs. This does away with the necessity of tying up a tractor when plowing is sporadic, or of maintaining a special tractor for engagement with a complicated plow arrangement.

The advantages and disadvantages of these devices are multiplied when combined with the inherent problems in plowing cable. For example, trailed plows generally comprise a frame to which a plowshare is rigidly mounted. The share is raised and lowered with respect to the ground by raising and lowering the frame. This means that this type share is essentially rotating on a long radius arm about the hitch point and that the angle of attack of the plow point varies for different plowing depths. In other words, plows of this type are designed to plow only at one depth, that being the depth at which the plowshare will find itself when the frame is in its fully lowered position. When a device of this type is used to plow cable at a depth other than at its designed depth, the efficiency of the plowshare is reduced because the angle of attack of the plowshare with respect to the ground has been changed due to rotation of the frame about the hitch point. Using a plow in such a condition, may not yield the designed results in that the ground may be excessively disturbed because of the improper alignment of the plowshare, the cable may be damaged due to the fact that it is not laid in a straight line, or as the plowshare was designed to lay it, and pulling forces are increased.

A disadvantage of the trailed plow has been previously mentioned. Because trailed plows rotate around the hitching point they cannot rely upon the weight of the prime mover to assist them in staying in the ground. If the ground through which the cable is being plowed is especially hard, or if the plow is not working at its optimum position, the resultant of the forces acting against the plowshare may tend to lift the plow out of the ground thereby burying the cable at varying unknown depths, sometimes too near the surface for safety. In order to compensate for this disadvantage, some plows presented by the prior art suggest the use of auxiliary weights upon the plow frame. This leads to excessive weight upon the frame and increases the force required to lay the cable and in some instances, may be detrimental to the life of the plow itself.

In addition to the problems mentioned above is added the problems of providing cable for the plow and transporting cable reels with the plow and mover during the plowing operation. The prior art has suggested the use of reel trailers to be pulled behind the plow. This makes an excessively long train of vehicles which becomes too difficult to maneuver and nearly impossible to back or reverse in direction.

It would seem that the natural answer to these problems would be given by a fixed plow. However, it should be pointed out that fixed plows are also subject to their own advantages and disadvantages. For instance, the same forces that tend to rotate a trailed plow out of the ground may also tend to lift a fixed plow. If the forces are sufficient in lifting a fixed plow out of the ground, the tractor's weight may be offset enough to reduce the pulling power of the tractor and thereby prohibit further plowing with this device.

It is an object of this invention to improve the equipment available for plowing cable underground.

Another object of this invention is to eliminate the problem of transporting cable reels by auxiliary, bulky, and complicated means.

Another object of the invention is to overcome the problem of the plow lifting out of the ground by proper design of the tongue, thereby eliminating the necessity of using auxiliary weights.

Another object of the invention is to take advantage of the resultant force of the ground upon the plowshare and in cooperation with the tongue, increase the effective weight of the plow.

A still further object of the invention is the inclusion in a trailed frame of a share that moves with respect to the frame and presents an optimum angle of attack to the ground at all depths of plowing.

The invention comprises in general a trailed frame mounted upon two wheels and including a unique extendable tongue and a plowshare mounted to the frame by a 4-bar linkage. When the frame is hitched through its unique tongue to a mover, it remains in a generally level attitude. The share, through its 4-bar linkage, is raised and lowered with respect to the frame to its desired plowing depth. The linkage of which the plowshare is one arm, is designed so that when the share is raised or lowered, the share maintains the same attitude with respect to the frame and the ground no matter where it is positioned. In other words, if a horizontal line were scribed upon the side of the plowshare when it was raised, the line would remain horizontal throughout the lowering of the share to its maximum position.

The maneuverability of a trailed plow is directly related to the length of the vehicle being towed. It is therefore desirable in normal plowing operations, to use the trailed plow with as short a tongue as possible. However, if the line of action of the resultant force of the ground against the plowshare falls on the mover side of the hitch, the force will tend to create a moment that will lift the plow out of the ground using the hitch as a pivot point.

The invention includes an extendable tongue that may be used in its short or shortened position for normal plowing operations. When the ground becomes hard and the resultant force tends to lift the plow out of the ground, the tongue may be extended or lengthened so that the line of action of the resultant force no longer falls on the tractor side of the hitch, but in contrast, falls on the plow side of the hitch. When the tongue is extended, the resultant force creates a moment that tends to rotate the plow into the ground using the hitch as a pivot point. The result is that the effective weight of the plow is increased in proportion to the difficulty of the terrain through which the plowshare is being pulled.

The invention further includes means for eliminating the problem of transporting cable reels. These means comprise a pair of arms hydraulically attached to the frame. At the end of each arm, is a cradle in which the axle of a cable reel may be placed. The arms are lowered until they are in a position to receive the axle of the cable reel. The reel is then pushed between the arms so that the axle fits into the cradles. The arms are then raised, thereby lifting the reel off the ground and onto the plow frame.

The advantages of the invention are obvious. The invention provides a plow that eliminates or greatly reduces the lifting problem of trailed plows; namely, that the extendable tongue cooperates with the resultant force to increase the effective weight of the plow in rough terrain thereby tending to keep the plow at its designed depth. The plow also offers the advantages of a trailed unit in that it may readily be detachable from the mover thereby releasing it for other jobs. In addition, the plowshare, because of its 4-bar linkage, may be lowered and operated at any desired plowing depth without changing the angle of attack of the share point with respect to the ground. This means that the plowshare will operate at its optimum efficiency at all plowing depths. The invention further eliminates the need for towing reel trailers or adding complicated or bulky attachments for carrying cable reels. The plow is a self-contained unit that does not depend upon the mover for power to lower or raise the share nor to lower or raise the cable reels, but only to propel it in the direction it is to operate.

The above-mentioned advantages are obtained from the invention's features, one of which is a trailed plow that incorporates an extendable tongue to eliminate the problem of lifting the plow from the ground when it encounters rough plowing terrain.

Another feature of the invention, is a trailed plow that is capable of picking up and carrying its own cable reels.

Another feature of the invention is a trailed plow in which the frame is not raised or lowered to lower the plowshare, but in contrast, remains at the same attitude as the plow is propelled along the ground.

Another feature of the invention, is a trailed plow in which the plowshare forms one arm of a 4-bar linkage so that when the share is raised or lowered, it maintains the same attitude at any plowing depth.

Other objects, advantages, and features of the invention will be obvious and understood from the following detailed description when read in conjunction with the drawing, in which:

FIG. 3 is a sectional view of the extendable tongue subassembly;

FIG. 8 is a view taken generally along line 8—8 of FIG. 1 and shows the frame subassembly of the invention; and FIG. 9 is a side view of the plowshare subassembly.

Figure 1:
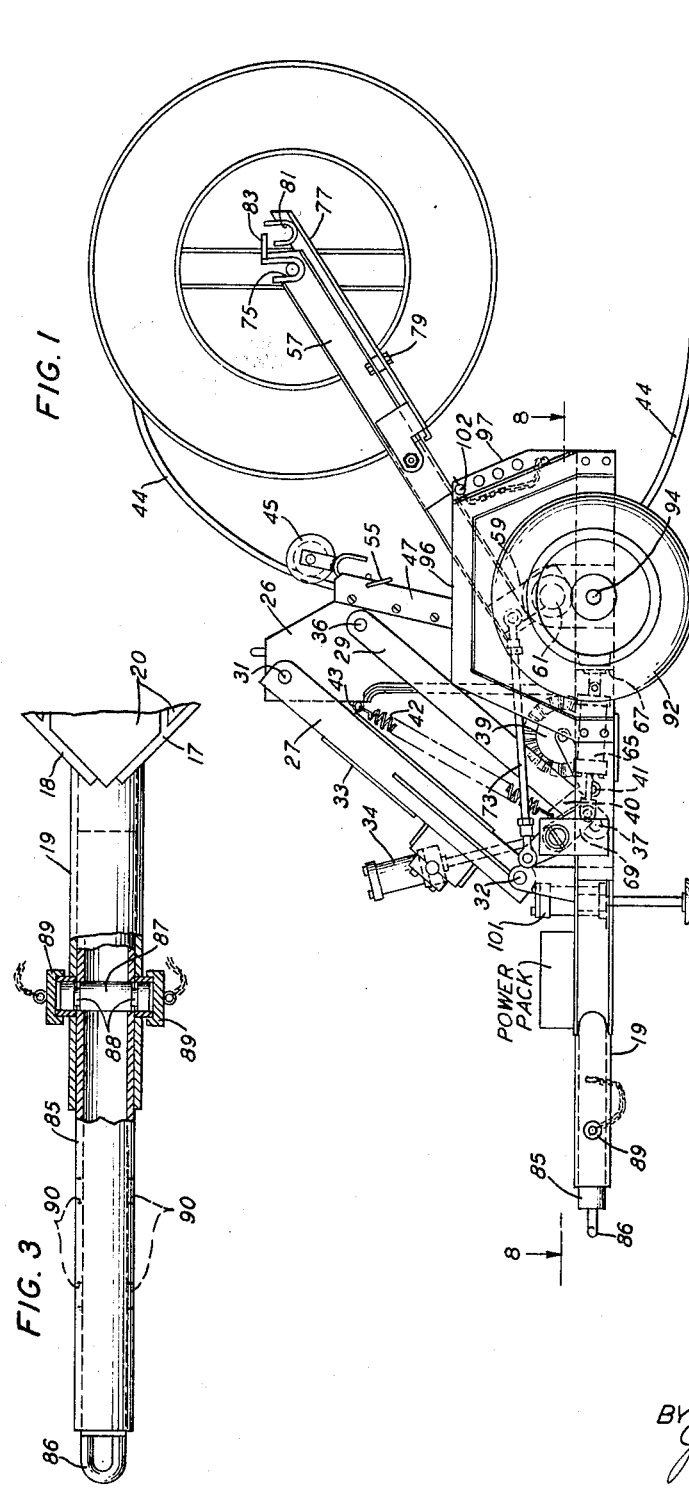
FIG. 1 is a side view of the invention showing the plowshare in its raised position and a cable reel in the raised position.

According to the preferred embodiment of the invention, the plow is comprised of four general subassemblies: the frame, the plowshare, the reel lifting, and the tongue subassemblies.

The frame subassembly is shown in FIG. 8. It is comprised of four longitudinal beams 11, 12, 13, and 14 that are joined at their forward ends by a triangular yoke comprising two transverse brace beams 15 and 16, and two beams 17 and 18 that form a generally triangular front to the frame. The base member 19 of the tongue assembly forms the altitude of the triangular-shaped yoke as shown in FIG. 3. Various stiffener plates 20 are welded at the beam joints both top and bottom to add to the structural rigidity of the frame.

The beam 11 is secured to the beam 12 by the transverse brace 21 to form a box-shaped section which is triangulated by member 22. In like fashion, the other two beams 13 and 14 are formed into a box section by transverse brace 23 and triangulated by member 24.

The two box sections, formed as above-described, are joined at their forward ends by the above-described triangular yoke. The two sections, joined by the yoke at one end, form a U-shaped trough 25 in which the share subassembly works.

The frame is made mobile by two wheels 91 and 92 which are attached to the frame by means of axles 93 and 94. The axle 93 penetrates beams 11 and 12 at their midpoint, while the axle 94 penetrates beams 13 and 14 at their midpoint. The axles 93 and 94 are spaced along the frame so that when the plowshare 26 is lowered, the wheels 91 and 92 will contact the ground at essentially the same line as the plowshare 26. The wheels 91 and 92 are covered by fenders 95 and 96 which have along their rear edges pairs of support braces 97 and 98, 99 and 100. The function of the braces 97, 98, 99, and 100 will be explained subsequently.

Figure 2:
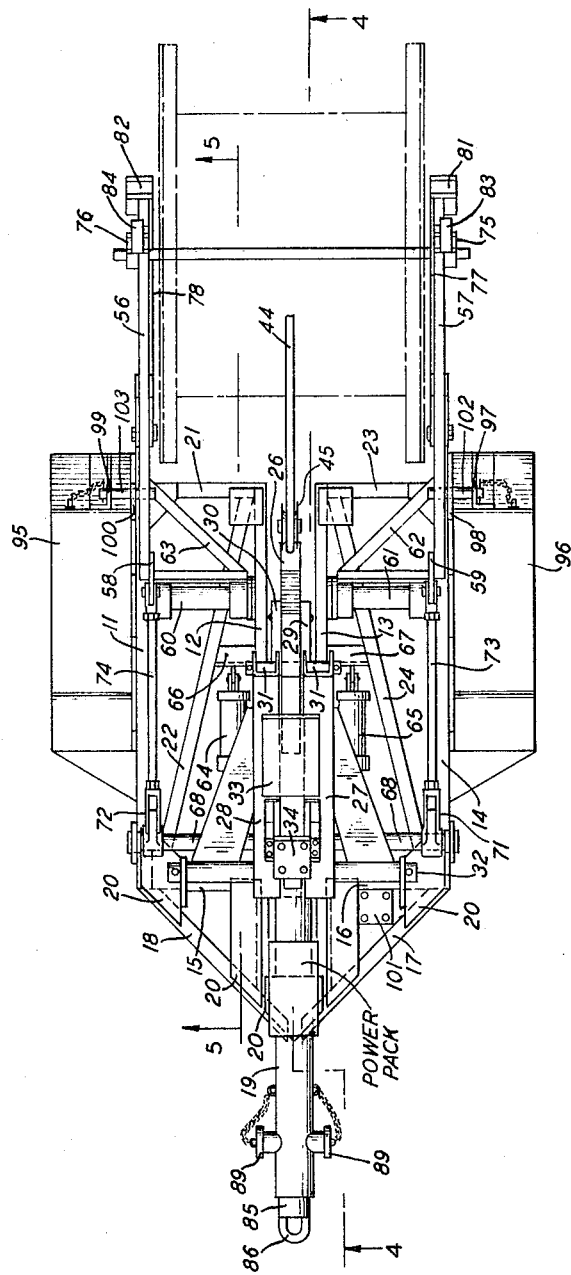
FIG. 2 is a plan view of the plow as shown in FIG. 1.
Figure 4:
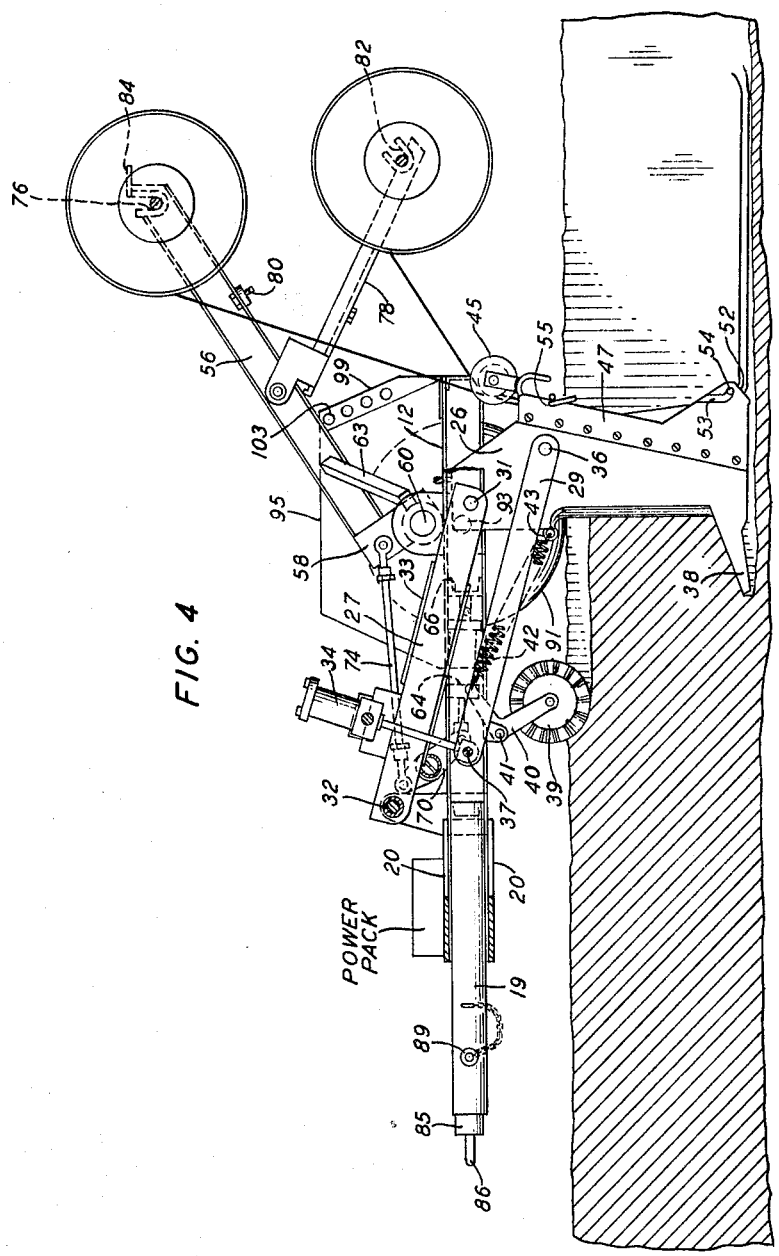
FIG. 4 is a section view taken generally along the line 4—4 of FIG. 2 showing the plow with its share in the lowered position and supporting two wire reels.
Figure 5:
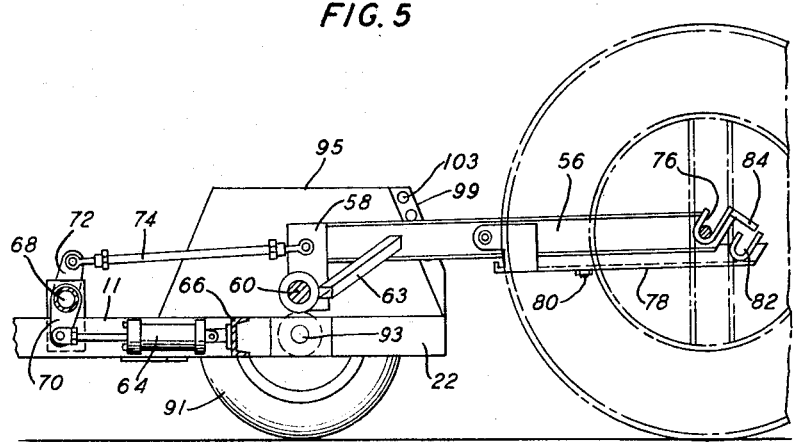
FIG. 5 is a section view taken generally along the line 5—5 of FIG. 2 showing the cable reel lifting subassembly.

In addition to the structure of the frame subassembly, the frame includes a power pack as indicated in FIGS. 1, 2, and 4, which comprises an engine, a pump, and other equipment necessary to operate the hydraulic apparatus of the invention. The power pack may comprise any well-known combination of the above-mentioned items and except for the fact that the plow contains its own power supply for its operation, the power pack is not deemed to be novel.

When the plow is disconnected from its prime mover a hydraulic leveling jack 101 may be used to maintain it in a level position until it is connected to a tractor. The invention also contemplates the inclusion of remote control means. These means, not shown, generally comprising controls necessary to hydraulically raise and lower the plowshare 26, hydraulically raise and lower the cable reel support arms 56 and 57, and to raise and lower the support jack 101, may be used by the tractor driver to operate the plow from the tractor or the controls may be used by an observer walking alongside the plow to perform the same functions.

The share subassembly is shown in FIG. 9 and is shown as an integral part of the invention in FIG. 4. The assembly comprises the share 26 which is attached to the frame by a pair of upper bar members 27 and 28 and a pair of lower bar members 29 and 30. The upper bar members 27 and 28 are pin jointed to the top of the share at joint 31 and to the frame at joint 32. A stiffener plate 33 is welded across the two upper members 27 and 28 for structural purposes.

The lower members 29 and 30 are pivoted to the share 26 at pin joint 36 and to the frame at joint 37. A hydraulic cylinder 34 is mounted atop the members 27 and 28 near the end of the members 27 and 28 adjacent to the pivot joint 32. The cylinder 34 works against the frame pivot joint 37 to raise and lower the share 26.

The length of the various members 27, 28, 29, and 30, and the spacing of the joints 31, 32, 36, and 37 are determined so that as the share 26 is raised or lowered by the cylinder 34 it always maintains the same attitude with respect to the ground. In other words, the share 26 and its mounting members 27, 28, 29, and 30 form a 4-bar linkage with the share 26 as one of the bars. As the linkage is moved, it is designed to maintain the share 26 at the same angular attitude with respect to the ground. A horizontal line scribed upon the side of the share 26 will remain horizontal whether the share 26 is in a raised attitude, slightly lowered attitude, or fully lowered attitude.

The design of the share mounting in this manner means that the plow may be used to insert cable in the ground at any depth up to its maximum design depth and still present the share point 38 to the ground at its most effective and efficient attitude. To change the attitude of the point 38 by rotating the point into the ground on the end of a long radius arm as suggested by the prior art, may result adversely in the need for increased pulling forces, excessive ground deformation, and uneven depth of cable burial.

The plow share 26 is designed to create a minimum of ground disturbance during the plowing operation. If the ground has a top layer of heavy interwoven sod, the share 26 may disturb the ground more than desired. In order to alleviate the problem a coulter wheel 39 is added as part of the plowshare subassembly. The wheel 39 is journaled to a right angle crank member 40. The member 40 is attached at a pin joint 41 to the lower members 29 and 30. The other end of the member 40 is attached to a spring 42 that is anchored to the share 26 by a ring 43. When the share 26 is raised, the coulter wheel 39 is raised with it and in the fully raised position rests on the point 38 of the share 26. When the share 26 is lowered, the spring 42 swings the coulter wheel 39 out and in front of the share 26. The wheel 39 is forced into the ground by the spring 42 and cuts the sod ahead of the share 26. The wheel 39 prepares a path for the share 26 to follow which results in smaller ground disturbances.

The share 26 is also designed to place cable 44 into the ground in the safest possible manner. On its rearmost edge, the share 26 includes an entrance roller 45 which guides and introduces incoming cable into the share 26. The share includes a channel 46 that is formed by the share side plates 47 and 48, a forward wall 49 and a removable back wall 50. The back wall 50 has mounted to it, a number of pulleys 51 that bend the cable in a gentle arc and guide it through the share 26 and into the ground through the share exit 52.

The back wall 50 is attached to the share 26 by means of the bayonet groove 53, bayonet 54, and locking pin 55. The wall 50 may be removed by extracting the pin 55 and the bayonet 54 from the groove 53. In this manner, cable may be taken from or introduced into the share 26 without cutting or threading the cable end into the share 26.

In order to alleviate the problem of towing additional equipment to transport cable and its reels, the invention includes a reel lifting subassembly. The assembly is comprised of two cable reel support arms 56 and 57 that are rigidly attached to leverage arms 58 and 59 which, in turn, are journaled to two axles 60 and 61. Braces 62 and 63 are also journaled to the axles 60 and 61 and are for the purpose of giving structural support to the support arms 56 and 57.

The support arms 56 and 57 are raised and lowered by means of two hydraulic cylinders 64 and 65 that act in concert to rotate the drive shaft 68.

The cylinders 64 and 65 are mounted within and work against the frame subassembly. As shown in FIG. 8 cylinder 64 works against anchor block 66 which is welded between the triangulation member 22 and beam 12 and cylinder 65 works against anchor block 67 which is welded between the triangulation member 24 and the beam 13. The outputs of the cylinders 64 and 65 are connected to two bell cranks 69 and 70 which convert the linear outputs of the cylinders 64 and 65 to rotational movement of the drive shaft 68. Two auxiliary bell cranks 71 and 72 spaced away from the cranks 69 and 70 work through tie-rods 73 and 74 against the leverage arms 58 and 59 to raise, or lower as the case may be, the support arms 56 and 57. The power to operate the cylinders 64 and 65 is supplied from the power pack mounted on the frame subassembly and allows the operation of the lifting subassembly without the connection of the invention to a tractor or prime mover.

The actual lifting of the reels is accomplished by cradling the axles of the reels in cradle supports. At the end of support arm 56 is a U-shaped cradle 76 and cradle 75 is located on the end of arm 57.

The cable reel is lifted by first lowering the support arms 56 and 57 to a level lower than the reel axle height. The plow is backed up to the reel until the arms 56 and 57 straddle the reel. The arms 56 and 57 are then raised making sure the ends of the reel axle will rest in the cradles 75 and 76 until the arms 56 and 57 are fully raised as shown in FIG. 1.

When the arms 56 and 57 are in their raised position, locking pins 102 and 103 may be inserted through appropriate holes in the support braces 97, 98, 99, 100 to lock the arms 56 and 57 in their raised position. The braces 97, 98, 99, and 100 are used in pairs so that the pins 102 and 103 will support the arms 56 and 57 without rotating.

The invention also contemplates the laying of wire or cable from multiple reels. Two auxiliary arms 77 and 78 are fastened to the underside of the support arms 56 and 57. The arms 77 and 78 may be lowered below the support arms 56 and 57, as shown in FIG. 4, by releasing a latch, bolt, or other similar fastening means 79 and 80. Cradles 81 and 82 are located on the ends of the arms 77 and 78 respectively, and provide, when the arms 77 and 78 are lowered, additional cradles for supporting multiple cable reel axles. In the preferred embodiment, the auxiliary arms 77 and 78 are not designed to structurally support a large cable reel so tabs 83 and 84 are attached to the rearward tips of the cradles 75 and 76 so that when the auxiliary arms 77 and 78 are raised, the tabs 83 and 84 close or block the access to the auxiliary cradles 81 and 82, and thereby prevent the lifting of a reel that is too heavy for the device.

The tongue subassembly is attached to the frame subassembly by means of the base member 19 that is welded as an integral part in the yoke part of the frame. The assembly comprises two telescoping tubes, base member 19 and the extendable member 85 which telescopes inside of the base member 19. The forward end of the member 85 contains a hitch 86 which is used to couple the plow to a tractor. Although a ring-type hitch has been shown, hitches that allow rotation around the three principal axes are contemplated and the invention is not to be limited to the hitch shown.

A shear pin 87, having two reduced cross-sectional areas 88, is used to fasten the two members 85 and 19 in a firm relationship with respect to each other. The amount of reduction of cross-sectional area used in the pin 87 is determinative of the load that the machine will bear before the pin 87 shears and releases the load. The pin 87 is a safety means included to prevent damage to the share 26 or the machine by excessive loads. End caps 89 are used to locate and retain the shear pin 87 in its proper position.

The member 85 includes a number of holes 90 that allow for various fastening positions of the extendable member 85 with respect to the base member 19. The member 85 is used in its short position as shown in FIG. 1 for normal plowing operations because the shorter the towed vehicle is the easier it is to manage. However, the tongue, for purposes to be subsequently explained, may be lengthened by removing the pin 87, pulling out member 85 and inserting the pin 87 in a hole 90 farther away from the hitch 86.

Figure 6:
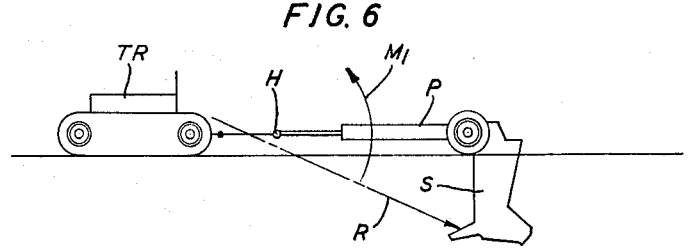
FIGS. 6 and 7 are diagrammatic sketches to explain the reversal of the moment generated by the resultant force on the plowshare as instituted by the lengthening of the tongue of the invention.
Figure 7:
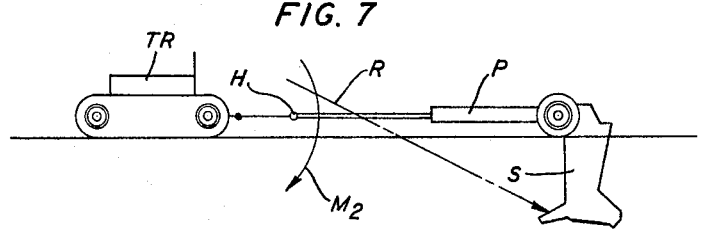

FIGS. 6 and 7 show the reason for extending the tongue of the invention. FIGS. 6 and 7 show diagrammatically, a tractor TR moving the invention P. The plow P is hitched to the tractor TR by a hitch H. As shown in FIG. 6, the line of action of the resultant force R that acts against the share S falls on the tractor side of the hitch H. This force R creates a moment $M_1$ that tends to rotate the plow P about the hitch H in a direction to lift the plow P out of the ground. The effective weight of the plow P is lessened and the burial depth of the cable may not be constant.

FIG. 7 shows the plow P with the tongue in its extended position. The line of action of the resultant force R now falls on the plow side of the hitch H and creates a moment $M_2$ tending to rotate the plow P into the ground, or in other words, tending to increase the effective weight of the plow P. An increase in the effective weight of the plow P also tends to increase the effective weight of the tractor TR thus enhancing the pulling power of the tractor TR. It should be noted, that in normal plowing operations, the tongue need not be extended but when the ground becomes excessively hard, the resultant force designated as R in FIGS. 6 and 7 may become large enough to raise the plow P out of the ground. The extendable tongue subassembly of the invention prevents such an occurrence.

FIGS. 6 and 7 show the reversing of the moment $M_1$ to $M_2$ in maximum conditions. As previously mentioned, trailed plows are easier to operate and more maneuverable when the trailed vehicle is as short as possible. Therefore, if the ground is not hard enough to warrant a full extension of the extendable tongue, the tongue should be used in an intermediate extended position. Although this may not be sufficient to completely reverse the direction of the moment $M_1$ to $M_2$, the moment $M_1$ may be sufficiently reduced to prevent the lifting of the plow from the ground. In any event, if the plow continues to raise out of the ground, the tongue may be extended to its fully extended position which will reverse the moment $M_1$ to that of $M_2$ and the resultant force R as it increases in magnitude due to the hard ground, will increase the moment $M_2$ and maintain the invention in the ground.

It will be obvious to those skilled in the art that various changes, additions, or alterations of the preferred embodiment of the invention shown in the figures of the drawing such as adding axle latching means to the reel cradles and depth gauges to the share, can be made. These changes and alterations are too numerous to mention and need not be because they are obvious and well within the scope of the invention disclosed above and the appended claims.

What is claimed is:
1. A cable plow comprising a frame mounted upon two wheels and adapted to be trailed behind moving means, a share pin jointed to said frame by arm members, holding means including said members for maintaining said share in the same attitude with respect to the ground, an extendable tongue rigidly mounted to the front of said frame said tongue including hitching means on its foremost end, said tongue being sufficiently extendable to cause the line of action of the resultant force of the ground against said share to create a moment about said hitching means that assists in maintaining the share in the ground, main reel support arms raisably and lowerably attached to the rear of said frame, said main arms including main cradles on their outermost ends, said main cradles being adapted to receive the ends of a reel axle, auxiliary reel support arms attached to said main support arms, said auxiliary reel support arms having an operative and an inoperative position, said auxiliary reel support arms including auxiliary cradles on their outermost ends and being adapted to receive the ends of reel axles, and tabs on one clip of said main cradles, said tabs extending away from said main cradles and adapted to block the entrance into the auxiliary cradles when said auxiliary reel support arms are not in an operative position.

2. A plow according to claim 1 wherein said frame is comprised of two extended sections joined at one end by a yoke, said sections and said yoke forming a U-shaped trough, said share being raisable and lowerable in said trough, said members comprising the upper pair arms and the lower pair arms of a 4-bar linkage in which said share is one bar and said frame is the base bar of said linkage.

3. The plow described in claim 2 wherein said tongue is comprised of telescoping tube sections, said sections adjustably fastenable together by means of a shear pin.

4. A plow as in claim 3 wherein said holding means form with said members a parallelogram linkage holding said share to said frame.

References Cited by the Examiner

UNITED STATES PATENTS

| | | | |
|---|---|---|---|
| 1,309,468 | 7/1919 | Dunn | 172—679 X |
| 2,943,583 | 7/1960 | Ryan | 61—72.6 |
| 3,170,300 | 2/1965 | Kelley | 61—72.6 |
| 3,175,368 | 3/1965 | Tibbits | 61—72.6 |

FOREIGN PATENTS

| | | |
|---|---|---|
| 937,655 | 1956 | Germany. |

CHARLES E. O'CONNELL, *Primary Examiner.*

JACOB SHAPIRO, *Examiner.*